United States Patent Office 3,476,710
Patented Nov. 4, 1969

3,476,710
PROCESS FOR PRODUCING A HIGH MOLECULAR WEIGHT LINEAR URETHANE POLYMER
Siegfried Altscher, Union, N.J., and Charles A. Fetscher, Olean, N.Y., assignors to Diamond Shamrock Corporation, a corporation of Delaware
No Drawing. Filed Dec. 6, 1966, Ser. No. 599,397
Int. Cl. C08g 22/06
U.S. Cl. 260—77.5                                    10 Claims

ABSTRACT OF THE DISCLOSURE

A high molecular weight solvent soluble urethane polymer is produced by reacting a polyol having two reactive hydroxyl groups with an organic diisocyanate under anhydrous conditions at a ratio of 1.0 OH equivalent of said polyol to about 1.01 to about 1.10 NCO equivalent of said diisocyanate to obtain an isocyanate terminated urethane polymer and polymerizing said isocyanate terminated polymer in the presence of an isocyanate-isocyanate inducing catalyst under anhydrous conditions.

This invention relates to an improved process for producing high molecular weight linear urethane polymers and more particularly to an improved process for producing higher molecular weight urethane polymers having improved properties.

It is well known that the reactants employed in condensation polymerization processes should be present in equivalent amounts. The two reactants must be present in exactly equivalent proportions in bifunctional or linear polymer systems to ensure the longest possible linear chains, that is, the highest molecular weights. The presence of equivalent amounts of bifunctional groups in the reactants provides a safeguard against premature termination of the condensation polymerization reaction by formation of low molecular weight polymers. Processes for producing high molecular weight condensation polymers such as nylon, Spandex, and the like employ exact equivalents of the reactants to obtain polymers having the highest possible molecular weights.

An object of the present invention is to provide a new and improved process for producing high molecular weight linear urethane polymers. A further object of this invention is to produce linear urethane polymers having longer linear chains and higher molecular weights than the polymers obtained by the processes of the prior art. Other objects will become apparent from the detailed description given hereinafter.

The above and other objects of this invention have been most unexpectedly and successfully achieved in the following manner. We have discovered an improved process for producing linear urethane polymers having longer linear chains and higher molecular weights than those obtained by the processes employed by the prior art. Furthermore, we have found that linear polymers produced by the improved process of the present invention have greatly enhanced properties not obtained by the processes of the prior art. We have discovered an improved process which employs less than equimolar amounts of reactants, that is, a stoichiometric deficiency of a polyol having two reactive hydroxyl groups is reacted with an isocyanate-terminated compound having two reactive isocyanate groups so that the resulting chain extended, isocyanate terminated prepolymer then forms very high molecular weight, linear urethane polymers by subsequent isocyanate-isocyanate interreaction in the presence of a catalyst. By the term, stoichiometric deficiency of polyol is reacted with an isocyanate terminated compound, is meant that 1.0 OH equivalent of the polyol is reacted with from about 1.01 to about 1.10 NCO equivalent of the isocyanate-terminated compound.

The isocyanate-terminated compound can be either a diisocyanate or an isocyanate-terminated prepolymer which is the reaction product of a diisocyanate and a polyol having two terminal hydroxyl groups. Such prepolymers have two reactive isocyanate groups and are frequently used instead of diisocyanates. The polyol can be an alkylene glycol such as ethylene glycol or a polyoxyalkylene glycol such as polyoxyethylene glycol also known as polyethylene glycol. Such polyoxyalkylene glycols may have average molecular weights as high as 6000. When desired, mixtures containing two or more of the above mentioned isocyanate-terminated compounds and/or polyols may be used in the process disclosed in the present invention.

Briefly, the process of the present invention involves reaction of the above proportions of polyol and isocyanate-terminated compound at a temperature of about 25° C. to about 85° C. to obtain an isocyanate-terminated linear urethane polymer of medium or intermediate molecular weight. This isocyanate-terminated linear urethane polymer is then polymerized further by isocyanate-isocyanate interreaction in the presence of an isocyanate-isocyanate reaction inducing catalyst at about 45° C. to about 110° C. to obtain the desired high molecular weight linear urethane polymer. Usually a nonreactive catalyst is used. When the catalyst is a polyol having a tertiary nitrogen atom, the polyol functions both as a reactant and as a catalyst. That is, the terminal reactive hydroxyl groups present in such polyol react with the reactive isocyanate groups in the isocyanate-terminated compound to produce an isocyanate-terminated polymer containing tertiary nitrogen atoms. The tertiary nitrogen atoms present in the isocyanate-terminated polymer then function as an internal catalyst which catalyses the isocyanate-isocyanate interreaction of the reactive isocyanate groups present in the isocyanate-terminated polymer to produce the desired high molecular weight urethane polymer.

Individual polyols and isocyanate-terminated compounds can be used in the process disclosed in the present invention. For example, an alkylene glycol can be reacted with a diisocyanate to produce an isocyanate-terminated prepolymer and additional alkylene glycol can then be reacted with the prepolymer to produce the desired high molecular weight urethane polymer. Polyoxyalkylene glycol can be reacted with a diisocyanate to produce an isocyanate-terminated prepolymer and additional polyoxyalkylene glycol can then be reacted with the prepolymer to produce the desired high molecular weight urethane polymer. An alkylene glycol can be reacted with a diisocyanate to produce an isocyanate-terminated prepolymer and a polyoxyalkylene glycol can then be reacted with the prepolymer to produce the desired high molecular weight urethane polymer. A polyoxyalkylene glycol can be reacted with a diisocyanate to produce an isocyanate-terminated prepolymer and an alkylene glycol can then be reacted with the prepolymer to produce the desired high molecular weight urethane polymer. When desired, mixtures of polyols can be used instead of individual polyols in any of the above process variations. Likewise, mixtures of diisocyanates, isocyanate-terminated prepolymers or diisocyanates and isocyanate-terminated prepolymers can be used instead of individual isocyanate-terminated compounds.

The linear urethane polymers produced by the process of this invention have higher molecular weights than those obtained by the process disclosed in the prior art. Furthermore, the polymers of the present invention have greatly enhanced properties such as tensile strength, abrasion resistance, improved solvent resistance. It is of course understood that these properties are also in part influenced by the nature of the reactants, e.g., the polyol used in reaction with the diisocyanate or the isocyanate terminated prepolymer. High molecular weight solvent soluble polymers as well as water soluble polymers can be prepared by the process disclosed in this invention. When polyols containing a tertiary amine group are used, the resulting polymer can be neutralized with an acid to obtain water soluble and water dispersible polymers. Since the polymers do not contain reactive isocyanate groups, they can be used in aqueous systems such as solutions, emulsions, dispersions and the like. The enhanced properties of the polymers as well as their higher molecular weights make them particularly suitable for use as coatings, films, fibers, other shapes and the like.

Isocyanate-terminated compounds useful in the present invention include both diisocyanates and isocyanate-terminated prepolymers. Useful isocyanate-terminated prepolymers are the reaction products of at least one diisocyanate with at least one polyol having two terminal hydroxyl groups. The sole reactive groups in an isocyanate-terminated prepolymer are reactive isocyanate groups. Such isocyanate-terminated prepolymers are well known in the art and are frequently used instead of diisocyanate because the prepolymers are less toxic and have lower volatilities than diisocyanates per se.

Isocyanate-terminated urethane prepolymers are prepared under anhydrous conditions by mixing at least one anhydrous alkylene glycol or anhydrous polyoxyalkylene glycol with an excess of at least one organic diisocyanate and heating the resulting reaction mixture under a blanket of an anhydrous, inert gas at a temperature of from about 50° C. to about 100° C. to form an urethane prepolymer whose sole reactive groups are reactive isocyanate groups. If desired, an inert anhydrous solvent may be used. It is to be understood that such inert solvent does not react with the reactants. An alternate procedure is to react only part of diisocyanate with an excess of the alkylene glycol or polyoxyalkylene glycol and then react the resulting hydroxyl terminated prepolymer with the remainder of the diisocyanate so that the total amount of diisocyanate represents an excess of diisocyanate in respect to the amount of alkylene glycol or polyoxyalkylene glycol employed and the final product is an isocyanate-terminated prepolymer whose sole reactive groups are reactive isocyanate groups.

As examples of isocyanates having two reactive isocyanate groups, the following diisocyanates can be used. Such diisocyanates include tolylene - 2,4 - diisocyanates, tolylene 2,6-diisocyanate, tolylene diisocyanate (65% 2,4; 35% 2,6), tolylene diisocyanate (80% 2,4; 20% 2,6), 1,6-hexamethylenediisocyanate (HDI), 1,4-tetramethylenediisocyanate, hexamethylene diisocyanate, 1,10-decamethylenediisocyanate, 1,5 - naphthalenediisocyanate (NDI), cumene - 2,4-diisocyanate, 4-methoxy-1,3-phenylenediisocyanate, 4-chloro-1,3-phenylenediisocyanate, 4-bromo-1,3-phenylenediisocyanate, 4-chloro - 1,3 - phenylenediisocyanate, 4 - bromo - 1,3-phenylenediisocyanate, 4-ethoxy-1,3-phenylene - diisocyanate, 2,4'-diisocyanathodiphenylether, diphenyl methane-4,4'-diisocyanate (MDI), 5,6-dimethyl-1,3-phenylenediisocyanate, 2,4-dimethyl-1,3-phenylene diisocyanate, 4-isopropyl-1,3-phenylene diisocyanate, 4,4'-diisocyanatodiphenylether, benzidinediisocyanate, o-nitrobenzidene diisocyanate, 4,6 - dimethyl-1,3-phenylenediisocyanate, 9,10-anthracene-diisocyanate, 4,4'-diisocyanatodibenzyl, 3,3'-dimethyl-4,4'-diisocyanatodiphenylmethane, 2,6 - dimethyl - 4,4'-diisocyanatodiphenyl, 2,4-diisocyantostilbene, 4,4'-diphenyl diisocyanate (XDI), 3,3'-dimethyl-4,4'-diphenyl diisocyanate (TODI), 3,3'-dimethoxy-4,4'-diphenyl diisocyanate (DADI), 1,4-anthracenediisocyanate, mesitylene diisocyanate, durylene diisocyanate, 2,5-fluorenediisocyanate, 1,8-naphthalene-diisocyanate, 2,6-diisocyanatobenzofuran and the like. Another useful isocyanate is DDI, a diisocyanate derived from dimer acids containing 36 carbon atoms and manufactured by General Mills. Mixtures of organic diisocyanates can also be used.

The abovementioned diisocyanates can be employed alone as the isocyanate component or in the preparation of an isocyanate-terminated prepolymer having two reactive isocyanate groups. An excess of diisocyanate is reacted with a polyol having two reactive hydroxyl groups to obtain an isocyanate-terminated prepolymer. For example, two moles of diisocyanate can be reacted with one mole of polyol. As examples of polyols having two reactive hydroxyl groups, which are useful in the preparation of prepolymers, there may be mentioned alkylene glycols such as ethylene glycol and polyoxyalkylene glycols having average molecular weights as high as 6000 such as a polyoxypropylene glycol having an average molecular weight of about 1000. Although polyols having molecular weights as high as 6000 can be used, polyols having average molecular weights of from about 200 to 1000 are normally used. Other alkylene glycols include propylene glycol, 1,4-butanediol, neopentyl glycol, hexylene glycol, decylene glycol, dodecylene glycol, their isomers, their mixtures and the like. When desired, glycols containing a tertiary nitrogen atom can be employed. Such glycols can be prepared by reaction of one mole of primary amine with two moles of an alkylene oxide. Such primary amines can be monomethylamine, monoethylamine, monoisopropylamine, monoisobutylamine, cyclohexylamine, aniline, benzylamine, their corresponding primary amine isomers, their mixtures and the like. As examples of alkylene oxides which can be condensed with the abovementioned primary amines, alkylene oxides such as ethylene oxide, propylene oxide, butylene oxide, their isomers, their mixtures and the like can be used. As examples of polyoxyalkylene glycols which may be employed in the production of prepolymers, there may be mentioned polyoxyethylene glycol having an average molecular weight of about 200, polyoxypropylene glycol having an average molecular weight of about 600, polyoxyhexamethylene glycol having an average molecular weight of about 800, polyoxyoctamethylene glycol having an average molecular weight of about 600, polyoxynonamethylene glycol having an average molecular weight of about 700, polyoxydecamethylene glycol having an average molecular weight of about 800, polyoxydodecamethylene glycol having an average molecular weight of about 900 and mixtures thereof. Polyoxyalkylene glycols containing several different radicals in the molecular chain such as, for example, compounds of the formula can be used:

wherein $n$ is an integer greater than one and gives glycols having an average molecular weight of about 1000. For example, polyacetals of the above formula having hydroxyl groups and molecular weights of about 136 can be prepared when an aldehyde such as formaldehyde and an alcohol such as ethylene glycol are reacted. Other useful polyoxyalkylene glycols can be prepared by reacting a 1,2-alkylene oxide such as ethylene oxide, propylene oxide, butylene oxide, their mixtures or the like with one of the abovementioned alkylene glycols. Likewise, useful polyoxyalkylene glycols having a tertiary nitrogen atom can be prepared by condensing one or more moles of a 1,2-alkylene oxide such as ethylene oxide, propylene oxide, butylene oxide, their isomers, their mixtures or the like with one mole of the abovementioned alkylene glycols having a tertiary nitrogen atom.

As examples of polyols having two reactive hydroxyl groups which can be reacted with isocyanate-terminated compounds such as diisocyanate and/or isocyanate-terminated prepolymers having two reactive isocyanate groups by the process disclosed in this invention to obtain high molecular weight linear urethane polymers, there may be mentioned alkylene glycols such as ethylene glycol and polyoxyalkylene glycols (polyethers) having average molecular weights as high as 6000 can be used such as a polyoxypropylene glycol having an average molecular weight of about 1000. Although polyols having average molecular weights as high as 6000 can be used, polyols having average molecular weights of from about 200 to 1000 are generally used. Other useful alkylene glycols include alkylene glycols such as propylene glycol, 1,4-butanediol, neopentyl glycol, hexylene glycol, decylene glycol, dodecylene glycol, their isomers, their mixtures and the like. When desired, glycols having a tertiary nitrogen atom can be employed. Such glycols can be prepared by reaction of one mole of primary amine with two moles of an alkylene oxide. Such primary amines can be monomethylamine, monoethylamine, monoisopropylamine, monoisobutylamine, cyclohexylamine, aniline, benzylamine, their corresponding primary amine isomers, their mixtures and the like. As examples of alkylene oxides which can be condensed with the abovementioned primary amines, alkylene oxides such as ethylene oxide, propylene oxide, butylene oxide, their isomers, their mixtures and the like can be used. As examples of polyoxyalkylene glycols (polyalkylene glycols), which can be reacted with diisocyanates and/or isocyanate terminated prepolymers to produce high molecular linear urethane polymers by the process disclosed in this invention, there may be mentioned polyoxyethylene glycol having an average molecular weight of about 200, polyoxypropylene glycol having an average molecular weight of about 600, polyoxyhexamethylene glycol having an average molecular weight of about 800, polyoxyoctamethylene glycol having an average molecular weight of about 600, polyoxynonamethylene glycol having an average molecular weight of about 700, polyoxydecamethylene glycol having an average molecular weight of about 800, polyoxydodecamethylene glycol having an average molecular weight of about 900 and mixtures thereof. Polyoxyalkylene glycols containing several different radicals in the molecular chain such as, for example, compounds of the formula can be used:

$$HO(CH_2OC_2H_4O)_nH$$

wherein $n$ is an integer greater than one and gives glycols having an average molecular weight of less than 1000. For example, polyacetals of the above formula having hydroxyl groups and molecular weights of about 136 can be prepared when an aldehyde such as formaldehyde and an alcohol such as ethylene glycol are reacted. Other useful polyoxyalkylene glycols can be prepared by reacting a 1,2-alkylene oxide such as ethylene oxide, propylene oxide, butylene oxide, their isomers, their mixtures or the like with one of the abovementioned alkylene glycols. Likewise, useful polyoxyalkylene glycols having a tertiary nitrogen atom can be prepared by condensing one or more moles of a 1,2-alkylene oxide such as ethylene oxide, propylene oxide, butylene oxide, their isomers, their mixtures or the like with one mole of the abovementioned alkylene glycols having a tertiary nitrogen atom.

Isocyanate-terminated linear urethane polymers are prepared by reacting 1.0 OH equivalent of one or more of the abovementioned polyols, that is, alkylene glycols and/or polyoxyalkylene glycols with from about 1.01 to about 1.10 NCO equivalent of one or more of the abovementioned isocyanate compounds, that is diisocyanates and/or isocyanate-terminated prepolymers having two reactive isocyanate groups. All reactants should be anhydrous. The reaction is carried out under anhydrous conditions and under an anhydrous nitrogen, or other inert gas, blanket. After reaction, the resulting isocyanate-terminated linear urethane polymer is stored under anhydrous conditions and is polymerized in the presence of an isocyanate-isocyanate reaction inducing catalyst to the desired high molecular weight linear urethane polymer under anhydrous conditions.

As examples of catalysts, which may be used to induce isocyanate-isocyanate reaction of the isocyanate terminated linear urethane polymer, there may be mentioned lead, lithium, sodium or potassium salts of organic acids containing from one to thirty-six carbon atoms. Such salts can be prepared from acids such as acetic acid, propionic acid, butyric acid, capric acid, caproic acid, 2-ethyl hexoic acid, oleic acid, stearic acid, linoleic acid, maleic acid, benzoic acid, phthalic acid, their isomers, their mixtures and the like. Such salts include lithium stearate, lithium 2-ethylhexoate, lithium naphthenate, potassium 2-ethylhexoate, sodium 2-ethylhexoate, sodium oleate, potassium acetate and the like. When desired, glycols having a tertiary nitrogen atom may be used as catalysts. Other catalysts include methyldiethanolamine, ethyldiethanolamine, N - benzyldiethanolamine, isopropyldiethanolamine, m-tolyldiethanolamine and the like as well as their condensates with 1,2-alkylene oxides; the abovementioned glycols and polyoxyalkylene glycols having a tertiary nitrogen atom, their mixtures and the like. Other suitable catalysts include N-methyl morpholine, N-ethyl morpholine, dimethyl hexadecyl tertiary amine, triethylamine, N,N-diethylcyclohexylamine, triethylenediamine (DABCO—Houdry Process & Chemical Co., Philadelphia, Pa.) and the like. Tin compounds such as stannous octoate, stannous oleate, dibutyl tin oxide, dibutyl tin dilaurate and the like can also be used. Other useful catalysts include organic arsenic compounds, organic antimony compounds, metal acetylacetonates and the like.

The quantity of catalyst employed will vary depending upon the type of catalyst, the reaction conditions employed and the reaction rate desired. Normally, from about 0.01 part by weight to about 5 parts by weight of a non-reacting catalyst per 100 parts by weight of isocyanate-terminated linear polyurethane polymer is employed. Where the catalyst is a part of a reactant involved in the polymer formation, as in a glycol having a tertiary nitrogen atom, the quantity must be chosen so that an excess of OH groups is not employed and so that the concentration of catalyst groups is not so great that the chemical polymerization reaction becomes uncontrollable as to mechanism or heat content.

The properties of the linear polymers produced by the process disclosed in this invention were evaluated in the following manner. The intrinsic viscosity $[\eta]$ of the linear polymers was determined using the following formulas and procedures.

$$[\eta] = \frac{\eta \text{ specific}}{c} \text{ at infinite dilution}$$

wherein $c$ is concentration in grams per deciliter. The value of $\eta$, the viscosity of the polymer solution and the value of $\eta_o$, viscosity of the solvent were determined by the usual standard procedure using an Ostwald viscosimeter. The following relationship exists between $\eta$ and $\eta_o$:

$$\eta \text{ relative} = \eta/\eta_o$$

and $$\frac{\eta \text{ specific}}{c} = \frac{(\eta \text{ specific} - 1)}{c}$$

when $$\frac{\eta \text{ specific}}{c}$$

is plotted versus $c$, one obtains the value of the intrinsic viscosity, $[\eta]$ is the intercept on the ordinate where $c$ is zero, that is, at infinite dilution. The intrinsic viscosity, $[\eta]$ is related to the molecular weight of the polymer in the following manner:

$$[\eta] = KM^a$$

wherein $K$ is a constant which is function of temperature and structure, $M$ is the molecular weight and $a$ is a constant varying from 0.5 to 0.8. When $a$ is 0.5, $[\eta]$ varies with the square root of the molecular weight. When $a$ is 0.8, $[\eta]$ varies almost directly with the molecular weight.

For a 50% increase in the value of $[\eta]$ when a is 0.5, the molecular weight increases 125%, that is, the molecular weight is more than doubled. For a 50% increase in the value of $[\eta]$ when a is 0.8, the molecular weight increases 65%. Thus, the intrinsic viscosity, $[\eta]$ is useful in determining increases in the molecular weight of linear urethane polymers. The viscosities of the polymer solutions described in the examples below are also expressed as Gardner-Holt viscosities at 25° C.

Increases in the molecular weight of linear urthane polymers are also directly related to free film properties. That is, at higher molecular weights, tougher films are obtained as measured by their tensile strength properties. The higher molecular weight films have higher tensile strengths when compared to lower molecular weigh films. Preparation and testing of free unsupported films are described in greater detail in the examples below.

For a fuller understanding of the nature and objects of the present invention, reference may be made to the following examples, which are given merely to illustrate the invention and are not to be construed in a limiting sense. All weights, parts and proportions in these examples are by weight unless otherwise indicated. Likewise, all references to temperatures are to ° C. (centigrade) unless otherwise indicated.

EXAMPLE I

This example is directed to a preparation according to the prior art of a linear urethane polymer using a glycol reactant having a tertiary nitrogen atom and an (NCO/OH) ratio to 1.0/1.0.

To 174 g. (1.0 mole; 2.0 NCO equivalent) of tolylene diisocyanate (80% 2,4-isomer and 20% 2,6-isomer) were added under anhydrous conditions and under an anhydrous nitrogen blanket 213.5 g. (0.5 mole; 1.0 OH equivalent) of a polypropylene glycol having an average molecular weight of 427 over thirty minutes. An exothermic reaction occurred and the temperature was allowed to rise from 45° C. to about 75° C. and was then held at about 75° C. for 2.5 hours. The resulting reaction product was an isocyanate-terminated prepolymer which contained 10.55% by weight of reactive NCO groups and had an equivalent weight of 398 per NCO group which represented 0.975 NCO equivalent.

300 g. of dry methyl ethyl ketone was added to the prepolymer prepared above and 58.0 g. (0.488 mole; 0.975 OH equivalent) of dry methyldiethanolamine, a glycol reactant having a tertiary nitrogen atom were added over about twenty minutes and the temperature was allowed to rise from about 60° C. to about 80° C. The reaction mixture was then heated at about 80° C. for about five hours until all of the NCO groups had reacted and the reaction product, which was a linear polyurethane dissolved in methyl ethyl ketone, was obtained. The reactants employed in this example corresponded to an (NCO/OH) rate of 1.00/1.00. 146 g. of methyl ethyl ketone was added to the reaction product to obtain a 50% by weight solution of the linear urethane polymer. The resulting polymer solution had a Gardner-holt viscosity of Z-6 at 25° C. The intrinsic viscosity of the polymer $[\eta]$ was 0.238. A film of the polymer was a cast on a tin-plated panel and the cast film was removed by amalgamation of the panel with mercury. The free unsupported film was then conditioned at 75° F. and 50% relative humidity for 48 hours. Micro-tensile samples of the 1.3 mil thick film measuring 0.5 x 1.5 inches were used to obtain a stress-strain profile in a tensile strength tester. The sample was clamped between the jaws of the tester and the jaws then separated at a crosshead speed of one inch per minute until the sample failed. The tensile strength, the percent elongation at the break point and the 2% modulus were calculated from the stress-strain profile or curve. The film was found to have a tensile strength of 1050 p.s.i., an elongation at break of 530% and a 2% modulus of 30 p.s.i.

EXAMPLE II

This example is directed to the preparation of a linear urethane polymer by a process of the present invention using a glycol reactant having a tertiary nitrogen atom and an (NCO/OH) ratio of 1.02/1.00.

To 174 g. (1.0 mole; 2.0 NCO equivalent) of tolylene diisocyanate (80% 2,4-isomer and 20% 2,6-isomer) were added at about 45° C. under anhydrous conditions and under an anhydrous nitrogen blanket 213.5 g. (0.5 mole; 1.0 OH equivalent) of a polypropylene glycol having an average molecular weight of 427 over 30 minutes. An exothermic reaction occurred and the temperature was allowed to rise from about 45° C. to about 75° C. The mixture was reacted at about 75° C. for about 2.5 hours. The resulting reaction product was an isocyanate-terminated prepolymer which contained 10.3% by weight of NCO groups and had an equivalent weight of 408 per NCO group which represented 0.950 NCO equivalent.

800 g. or dry methyl ethyl ketone was added to the above prepolymer and 55.3 g. (0.465 mole; 0.930 OH equivalent) of dry methyldiethanolamine, a glycol reactant having a tertiary nitrogen atom was added over twent minutes while the reaction temperature was allowed to rise from about 60° C. to about 80° C. The reactants employed in this example correspond to an (NCO/OH) ratio of 1.02/100. The mixture was reacted at about 75° C. to about 80° C. for about five hours until all of the reactive NCO groups were reacted. The reaction product was a linear urethane polymer dissolved in methyl ethyl ketone. 971 g. of dry methyl ethyl ketone was added to the polymer to form a 20% by weight solution of the linear urethane polymer. This solution had a Gardner-Holt viscosity of R at 25° C. The intrinsic viscosity of the polymer $[\eta]$ was 0.343.

A film of the linear polymer was cast on a tin-plated panel and removed by amalgamation of the panel with mercury. The free unsupported film was then conditioned at 75° C. and 50% relative humidity for 48 hours. Microtensile samples of the 1.4 mil thick film of the polymer measuring 0.5 x 1.5 inches were used to obtain a stress-strain profile in a tensile strength tester. The sample was clamped between the jaws of the tester and the jaws were then separated at a crosshead speed of one inch per minute until the sample failed. The tensile strength, the percent elongation at the break point and the 2% modulus were calculated from the stress-strain profile. The film was found to have a tensile strength of 4025 p.s.i., an elongation at break of 525% and a 2% modulus of 20 p.s.i.

EXAMPLE III

This example is directed to a preparation according to the prior art of a linear urethane polymer using an (NCO/OH) ratio of 1.0/1.0 and no catalyst.

(A) To 14.92 g. (0.858 mole; 0.1716 NCO equivalent) of tolylene diisocyanate (80% 2,4-isomer and 20% 2,6-isomer) at .45° C. under an anhydrous nitrogen blanket and under anhydrous conditions were added 18.18 g. (0.0429 mole; 0.0858 OH equivalent) of an anhydrous polypropylene glycol having an average molecular weight of 424 over about thirty minutes. An exothermic reaction occurred and the temperature was allowed to rise to about 75° C. and was held at about 75° C. for about 2.5 hours. The resulting reaction product was an isocyanate-terminated prepolymer, which contained 10.78% by weight of NCO groups and had an equivalent weight of 390 per NCO group.

(B) To 14.92 g. (0.0858 mole; 0.1716 NCO equivalent) of tolylene diisocyanate (80% 2,4-isomer and 20% 2,6-isomer) under an anhydrous nitrogen blanket and under anhydrous conditions was added a solution of 3.86 g. (0.0429 mole; 0.0858 OH equivalent) of 1,4-butanediol in 18.75 g. of dry methyl ethyl ketone and the resulting reaction mixture was heated to 70° C. The reaction mixture was then heated at about 70° C. for about two hours. The resulting reaction product was an isocyanate terminated prepolymer, which contained 9.52% by weight of NCO groups and had an equivalent weight of 441 per NCO group.

(C) To a mixture of 33.10 g. (0.085 NCO equivalent) of the prepolymer obtained in part (A) above and 37.53 g. (0.085 NCO equivalent) of the prepolymer solution obtained in part (B) above was added under anhydrous conditions at 35° C. a mixture of 3.84 g. (0.0427 mole; 0.0854 OH equivalent) of 1,4-butanediol and 4.28 g. (0.0423 mole; 0.0846 OH equivalent) of neopentyl glycol over about 30 minutes. Hence, a total of 0.170 NCO equivalent and 0.170 OH equivalent were reacted corresponding to an (NCO/OH) ratio of 1.00/1.00. The reaction mixture was heated to about 70° C. to about 75° C. for about five hours. At the end of this five hour period, the NCO content of the reaction mixture had dropped to about 0.5% by weight. 17.23 g. of dry methyl ethyl ketone was added to the reaction mixture and the mixture was heated for an additional three hours at about 75° C. to about 80° C. At this point, the NCO content of the reaction mixture had dropped to about 0.25% by weight. 4.00 g. of isopropanol was added to the reaction mixture and the mixture was refluxed for one hour. The NCO content of the reaction mixture was 0.0% by weight. The reaction product was then cooled to room temperature and was found to be a solution containing 60% by weight of a linear urethane polymer having a Gardner-Holt viscosity of Z–5 at 25° C. The intrinsic viscosity of the polymer was 0.173.

A film of the polymer was cast on a tin-plated panel and the cast film was removed by amalgamation of the panel with mercury. The free unsupported film was then conditioned at 75° F. and 50% relative humidity for 48 hours. Micro-tensile strength samples of the 1.8 mil unsupported film after removal from the panel and measuring 0.5 x 1.5 inches were used to obtain a stress-strain profile in a tensile strength tester. The sample was clamped between the jaws of the tester and the jaws were then separated at a cross head speed of one inch per minute until the sample failed. The tensile strength, the percent elongation at the break point and the 2% modulus were calculated from the stress-strain profile. The film was found to have a tensile strength of 2525 p.s.i., an elongation at break of 72% and a 2% modulus of 65 p.s.i.

When a catalyst is used in the process of this example the product formed has essentially the same molecular weight as the product of this example, the only difference being the rate of reaction. With catalyst, the product is formed more rapidly than without catalyst.

EXAMPLE IV

This example is directed to the preparation of a linear urethane polymer by a process of the present invention using an (NCO/OH) ratio of 1.05/1.00 and adding a tertiary amine catalyst separately.

(A) To 26.90 g. (0.1545 mole; 0.3090 NCO equivalent) of tolylene diisocyanate (80% 2,4-isomer and 20% 2,6-isomer) at 30° C. under an anhydrous nitrogen blanket and under anhydrous conditions was added a solution of 33.10 g. (0.0772 mole; 0.1544 OH equivalent) of a polypropylene glycol having an average molecular weight of 429 in 40.0 g. of dry methyl ethyl ketone over thirty minutes. The resulting reaction mixture was reacted at about 75° C. for about 2.5 hours to obtain a solution of a prepolymer containing 6.85% by weight of NCO groups and having an equivalent weight of 614 per NCO group.

(B) To 47.70 g. (0.274 mole; 0.548 NCO equivalent) of tolylene diisocyanate (80% 2,4-isomer and 20% 2,6-isomer) at about 30° C. under anhydrous conditions and under an anhydrous nitrogen blanket was added a solution of 12.30 g. (0.137 mole; 0.274 OH equivalent) of 1,4-butanediol in 40.0 g. of dry methyl ethyl ketone over thirty minutes. The resulting reaction mixture was reacted at about 75° C. for about two hours and found to give a solution of prepolymer having 12.07% by weight of NCO groups and having an equivalent weight of 348 per NCO group.

(C) To 45.80 g. (0.0747 NCO equivalent) of the prepolymer solution obtained in part (A) above were added 26.10 g. (0.0751 NCO equivalent) of the prepolymer solution obtained in part (B) above and 3.21 g. (0.0357 mole; 0.0714 OH equivalent) of 1,4-butanediol and 3.68 g. (0.00354 mole; 0.0708 OH equivalent) of neopentyl glycol. The reaction mixture contained a total of 0.01498 NCO equivalent and 0.1422 OH equivalent corresponding to an (NCO/OH) ratio of 1.05/1.00. After agitating the reaction mixture for 10 minutes, 0.02 g. of triethylenediamine was added to the mixture as a catalyst and the mixture was then reacted at about 65° C. to about 75° C. until the NCO content was less than 0.05% by weight. 16.2 g. of dry methyl ketone and 5.0 g. of isopropanol were added to the reaction mixture and the reaction mixture was refluxed for one hour. The NCO content of the reaction mixture was 0.0% by weight. The reaction product was then cooled to room temperature and found to be a solution containing 50% by weight of a linear urethane polymer. The polymer solution had a Gardner-Holt viscosity of Z–6 at 25° C. The intrinsic viscosity[η] of the polymer was determined and found to be 0.232.

A film of the polymer was cast on a tin-plated panel and removed by amalgamation of the panel with mercury. The free unsupported film was then conditioned at 75° F. and 50% relative humidity for 48 hours. Microtensile strength samples of this 1.8 mil thick film measuring 0.5 x 1.5 inches were used to obtain a stress-strain profile in a tensile strength tester. The sample was clamped between the jaws of the tester and the jaws were then separated at a crosshead speed of one inch per minute until the sample failed. The tensile strength, the percent elongation at the break point and the 2% modulus were calculated from the stress-strain profile. The film was found to have a tensile strength of 9300 p.s.i., an elongation at break of 13% and a 2% modulus of 1500 p.s.i.

What is claimed is:

1. A process for producing a high molecular weight solvent soluble urethane polymer characterized by being soluble in methyl ethyl ketone which comprises
    (A) reacting at a temperature between about 25° C. and about 85° C. at least one polyol having two reactive —OH groups with at least one organic diisocyanate having two reactive —NCO groups under anhydrous conditions to obtain at least one isocyanate-terminated urethane polymer, there being present 1.0 —OH equivalent of said polyol and about 1.01 to about 1.10 —NCO equivalent of said organic diisocyanate thereby forming at least one isocyanate-terminated urethane polymer, and thereafter
    (B) polymerizing at a temperature between about 45° C. and about 110° C. said isocyanate terminated polymer in the presence of an isocyanate-isocyanate reaction inducing catalyst under anhydrous conditions.

2. The process as described in claim 1 wherein said polyol is ethylene glycol and said organic diisocyanate is a tolylene diisocyanate.

3. The process as described in claim 1 wherein said polyol is a polyoxyalkylene glycol having an average molecular weight of about 1000 and said organic diisocyanate is an isocyanate-terminated prepolymer having two reactive isocyanate groups and which is the reaction product of a diisocyanate and a polyoxyalkylene glycol having an average molecular weight of about 1000.

4. The process as described in claim 1 wherein said catalyst is a tertiary amine.

5. The process as described in claim 1 wherein said catalyst is methyldiethanolamine.

6. The process as described in claim 1 wherein said catalyst is triethylenediamine.

7. The process as described in claim 1 wherein said polyol is an alkyldiethanolamine and said organic diisocyanate is a prepolymer which is the reaction product of a diisocyanate and a polyalkylene glycol having an average molecular weight of 427.

8. The process as described in claim 1 wherein said polyol is methyldiethanolamine and said organic diisocyanate is a prepolymer which is the reaction product of tolylene diisocyanate and a polypropylene glycol having an average molecular weight of 427.

9. The process as described in claim 1 wherein said polyol is a mixture of 1,4-butanediol and neopentyl glycol and said organic diisocyanate is a mixture of a propolymer which is the reaction product of tolylene diisocyanate and 1,4-butanediol and a prepolymer which is the reaction product of tolylene diisocyanate and a polypropylene glycol having an average molecular weight of 429.

10. A high molecular weight linear urethane polymer produced by the process described in claim 1.

References Cited

UNITED STATES PATENTS

| | | | |
|---|---|---|---|
| 2,929,800 | 3/1960 | Hill | 260—77.5 |
| 2,995,530 | 8/1961 | Frisch et al. | 260—2.5 |

FOREIGN PATENTS 945,797  1/1964  Great Britain.

FOREIGN PATENTS

Sandler, "Journal of Applied Polymer Science," vol. 11, No. 6, pp. 811–815, relied upon (June 1967).

Saunders et al., Polyurethanes, Chemistry & Technology, Part I, pp. 12 and 94 relied upon (December 1962).

DONALD E. CZAJA, Primary Examiner

M. J. WELSH, Assistant Examiner

U.S. Cl. X.R.

117—132; 260—18, 67